(12) United States Patent
Jorgovanovic et al.

(10) Patent No.: US 11,818,742 B1
(45) Date of Patent: *Nov. 14, 2023

(54) NETWORK CHANNEL SELECTION FOR DEVICE WITH CO-LOCATED RADIO TRANSMITTERS AND RECEIVERS

(71) Applicant: Amazon Technologies, Inc., Seattle, WA (US)

(72) Inventors: Milos Jorgovanovic, Mountain View, CA (US); Ravi Ichapurapu, Morgan Hill, CA (US); Morris Yuanhsiang Hsu, Sunnyvale, CA (US); Ateet Kapur, Mountain View, CA (US); Pratik Kalpesh Patel, Sunnyvale, CA (US); Latha Srinivasan, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/884,809

(22) Filed: Aug. 10, 2022

Related U.S. Application Data

(63) Continuation of application No. 15/837,790, filed on Dec. 11, 2017, now Pat. No. 11,452,110.

(51) Int. Cl.
*H04W 72/542* (2023.01)
*H04W 72/02* (2009.01)
(Continued)

(52) U.S. Cl.
CPC .......... *H04W 72/542* (2023.01); *H04W 4/80* (2018.02); *H04W 72/02* (2013.01);
(Continued)

(58) Field of Classification Search
CPC ... H04W 72/542; H04W 4/80; H04W 72/541; H04W 72/02; H04W 72/0453
See application file for complete search history.

(56) References Cited

U.S. PATENT DOCUMENTS

2009/0238251 A1   9/2009   Rofougaran
2009/0252095 A1   10/2009  Lu et al.
(Continued)

OTHER PUBLICATIONS

U.S. Appl. No. 15/837,790, "Advisory Action," dated Mar. 4, 2021, 2 pages.
(Continued)

*Primary Examiner* — Basil Ma
(74) *Attorney, Agent, or Firm* — Kilpatrick Townsend & Stockton LLP

(57) ABSTRACT

A system and method for network channel selection is provided. A device includes WIFI, ZIGBEE, and BLUETOOTH communication controllers. The device's processor is configured to determine, using the communication controllers, a WIFI channel designated for communications and a first set of ZIGBEE channels designated for communications. The processor is configured to determine that a number of available BLUETOOTH channels that do not overlap the WIFI channel or any in-use ZIGBEE channels is less than a threshold number of BLUETOOTH channels required for communication using a BLUETOOTH protocol. The processor then determines the WIFI channel has a minimum duty cycle from among duty cycles of the WIFI channel and each ZIGBEE channel, determines a first BLUETOOTH channel that at least partially overlaps the WIFI channel, and causes the BLUETOOTH communication controller to transmit data using the first BLUETOOTH channel.

20 Claims, 10 Drawing Sheets

(51) Int. Cl.
  *H04W 4/80* (2018.01)
  *H04W 72/0453* (2023.01)
  *H04W 72/541* (2023.01)
  *H04W 76/10* (2018.01)

(52) U.S. Cl.
  CPC ..... *H04W 72/0453* (2013.01); *H04W 72/541* (2023.01); *H04W 76/10* (2018.02)

(56) References Cited

U.S. PATENT DOCUMENTS

| | | | |
|---|---|---|---|
| 2012/0082140 A1* | 4/2012 | Lin | H04W 72/1215 370/336 |
| 2013/0064111 A1 | 3/2013 | Linsky et al. | |
| 2014/0341108 A1 | 11/2014 | Desai et al. | |
| 2015/0043687 A1 | 2/2015 | Luo et al. | |
| 2015/0215950 A1 | 7/2015 | Amini et al. | |
| 2016/0360345 A1 | 12/2016 | Kim et al. | |
| 2017/0041955 A1 | 2/2017 | Abraham et al. | |
| 2017/0055159 A1* | 2/2017 | Boppana | H04W 72/0453 |
| 2017/0325252 A1 | 11/2017 | Dickey et al. | |

OTHER PUBLICATIONS

U.S. Appl. No. 15/837,790, "Advisory Action," dated Dec. 11, 2019, 3 pages.
U.S. Appl. No. 15/837,790, "Final Office Action," dated Dec. 11, 2020, 13 pages.
U.S. Appl. No. 15/837,790, "Final Office Action," dated Dec. 16, 2021, 16 pages.
U.S. Appl. No. 15/837,790, "Final Office Action," dated Sep. 6, 2019, 16 pages.
U.S. Appl. No. 15/837,790, "Non-Final Office Action," dated May 21, 2020, 13 pages.
U.S. Appl. No. 15/837,790, "Non-Final Office Action," dated May 24, 2021, 13 pages.
U.S. Appl. No. 15/837,790, "Non-Final Office Action," dated Mar. 6, 2019, 15 pages.
U.S. Appl. No. 15/837,790, "Notice of Allowance," dated May 18, 2022, 11 pages.

* cited by examiner

NETWORK CHANNEL SELECTION FOR DEVICE WITH CO-LOCATED RADIO TRANSMITTERS AND RECEIVERS

CROSS-REFERENCE TO RELATED APPLICATION

This application claims priority to and is a continuation of U.S. patent application Ser. No. 15/837,790, filed Dec. 11, 2017, and entitled "NETWORK CHANNEL SELECTION FOR DEVICE WITH CO-LOCATED RADIO TRANSMITTERS AND RECEIVERS," the content of which is hereby incorporated by reference in its entirety for all purposes.

BACKGROUND

The present invention relates generally to the field of electronic devices and, more particularly, to approaches for configuring radio transmitters co-located within the same electronic device. An increasing number of devices are configured to connect to networks in order to exchange information. In many cases, a single device may include a number of different communication controllers and corresponding transceivers to enable simultaneous communications using a number of different protocols. For example, a typical device may include communication controllers enabling simultaneous communication using BLUETOOTH, ZIGBEE, and wireless fidelity (WIFI) (e.g., 802.11) communication protocols.

For a particular protocol, the bandwidth for the protocol is subdivided into a number of channels. Each channel can be separately used in transmitting and receiving data. Because radio frequency (RF) spectrum is limited, the bandwidths allocated to particular communication protocols may overlap with one another. WIFI, BLUETOOTH and ZIGBEE protocols, for example, are allocated bandwidth in a frequency range of 2.40 gigahertz (GHz) to 2.48 GHz. Consequently, a particular channel used when communicating by one communication protocol may include or overlap with frequencies contained within a channel of another communication protocol. If multiple transmissions occur on overlapping channels at the same time, the transmissions may interfere with one another.

BRIEF DESCRIPTION OF THE DRAWING

The detailed description is set forth with reference to the accompanying figures. The use of the same reference numbers in different figures indicates similar or identical items or features.

DETAILED DESCRIPTION

Figure 1:
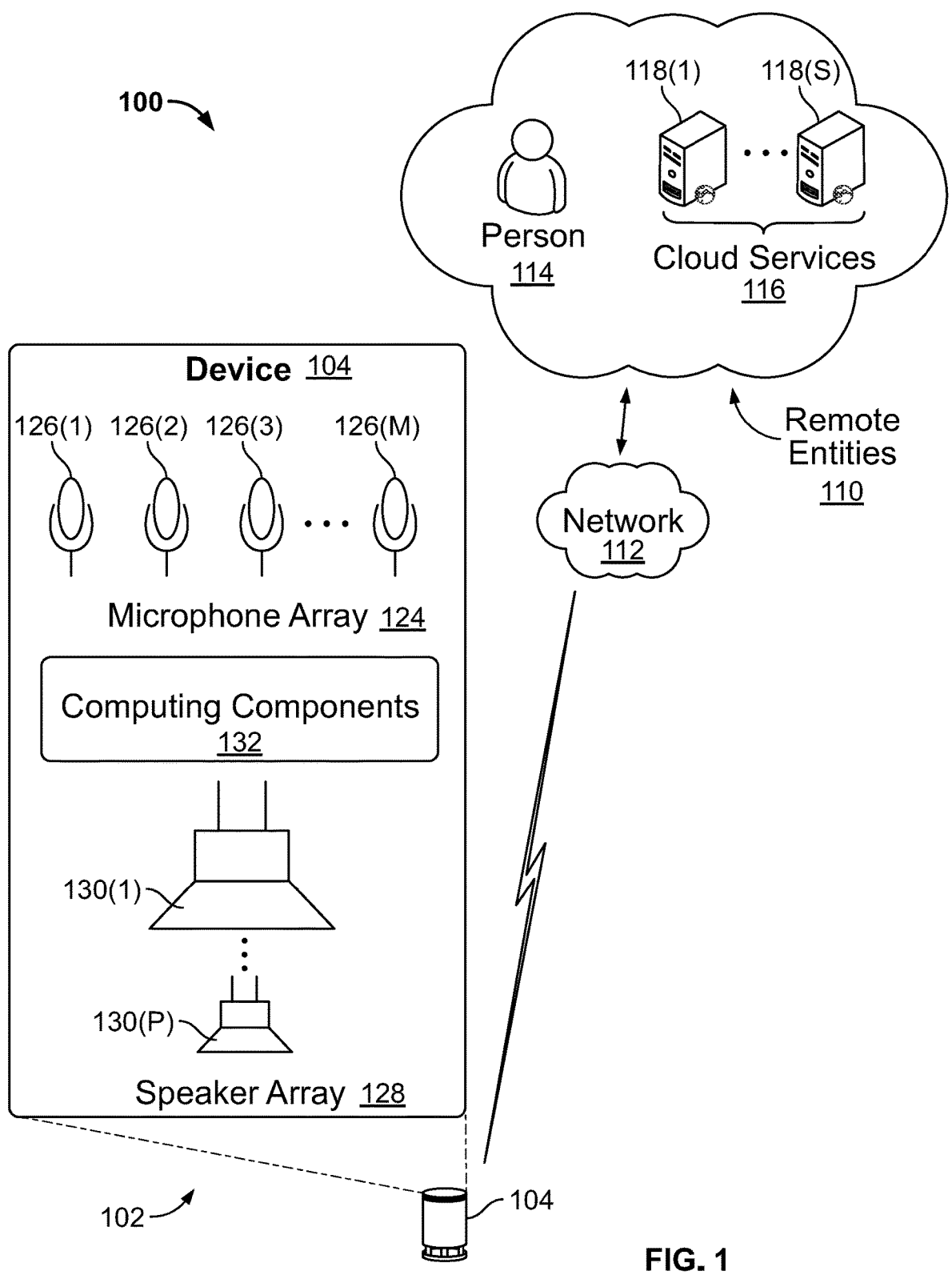
FIG. 1 depicts an exemplary environment including a device incorporating a communication subsystem configured in accordance with the present disclosure.

In many instances, an electronic device may utilize a number of different wireless communications protocols to transmit and receive data. For example, a network-connected speaker or smart phone device may simultaneously communicate using WIFI, BLUETOOTH, and ZIGBEE communication protocols. Typically, each communication protocol is allocated a particular bandwidth (i.e., a range of frequencies) for wireless transmissions and reception. The bandwidth for each protocol is allocated according to international standards. For a particular protocol, the allocated bandwidth is subdivided into a number of channels. Each channel can be separately used in transmitting and receiving data.

Because radio frequency (RF) spectrum is limited, the bandwidths allocated to particular communication technologies may overlap with one another. WIFI, BLUETOOTH and ZIGBEE protocols, for example, are allocated bandwidth in a frequency range of 2.40 gigahertz (GHz) to 2.48 GHz. Consequently, a particular channel used in accordance with one communication protocol may include frequencies contained within a channel allocated to another communication protocol. If a wireless interface broadcasts a message using a first communication technology (e.g., WIFI) using a channel that overlaps with a channel used by a second communication technology (e.g., BLUETOOTH) to broadcast a message at the same time, the two broadcasts may interfere with each other, potential resulting in a failed data transmission or other errors. Even though the channels associated with different protocols may themselves exhibit different bandwidths (i.e., WIFI channels typically include a greater bandwidth than BLUETOOTH channels), two channels may be said to overlap one another if they each include at least some of the same frequencies.

To mitigate the risk of interference due to communication technologies using channels that overlap one another, various communications technologies use frequency-hopping approaches in which random channels are selected for communications. By randomly selecting a channel, the risk of interference with other communication protocols can, in some cases, be mitigated.

For example, BLUETOOTH can employ an adaptive frequency hopping (AFH) scheme in which the channel selected for BLUETOOTH communications may avoid interference with other devices that transmit and receive data using channels overlapping the same frequency band. Initially, the BLUETOOTH controller randomly selects BLUETOOTH channels for communications and the interference levels for those channels are monitored. The AFH scheme then selects new channels for data transmission by prioritizing channels that exhibit lower interference levels. The reduced levels of interference on those prioritized channels can reduce interference with other communication protocols, thereby increasing the likelihood of successful data transmission and overall data transfer efficiency for BLUETOOTH-based transmissions.

Such an AFH scheme, however, requires that the BLUETOOTH device randomly select channels when initiating the AFH scheme. This random selection may be necessary because, upon initiation, interference data may not be available or measured for all BLUETOOTH channels. As a result, when a BLUETOOTH device begins operating, relatively high levels of interference may occur on the BLUETOOTH channels selected for initial communications.

To mitigate the problem, a scheme for selecting an optimized set of channels for BLUETOOTH communication is provided. Once selected, the set of channels can be utilized for BLUETOOTH communications. In an embodiment, the set of channels may be utilized as part of an AFH scheme.

The approach for selecting channels for BLUETOOTH communications may be implemented, for example, by an electronic device that incorporates BLUETOOTH, ZIGBEE, and WIFI communication interfaces and that may implement WIFI, BLUETOOTH, and ZIGBEE communication protocols. In a device with co-located (i.e., implemented within the same device) WIFI, BLUETOOTH, and ZIGBEE communication controllers, the device may communicate with each controller to determine the channels being utilized by or otherwise designated for use by each communication controller. Additionally, the device can determine the duty cycle being utilized for each in-use channel. Typically, the duty cycle refers to the ratio of a time period during which data is actively transmitted on a particular channel versus idle time with no active transmissions on the channel. As such, duty cycle may be an indicator of an average power level of transmissions on a particular channel. With the list of in-use channels and related duty cycles for each communication channel determined, the device can generate a list of channels that are available for BLUETOOTH communications that do not overlap (or otherwise interfere with) the in-use channels. The BLUETOOTH communication channels do not overlap the other in-use channels if the BLUETOOTH communications channels utilize or include of frequencies that are not included within the bandwidths of the in-use channels. If the number of available channels does not meet a minimum threshold—in some cases, BLUETOOTH communications can require a minimum threshold of 20 channels to communicate—the remaining BLUETOOTH channels that overlap or interfere, to some degree, with the in-use WIFI and ZIGBEE channels can be ranked using the duty cycle information to identify a set of BLUETOOTH channels that may exhibit a minimum level of interference with the in-use WIFI and ZIGBEE channels.

One or more of those BLUETOOTH channels that may exhibit a minimum level of interference may then be used in combination with the available BLUETOOTH channels to provide the minimum number of channels required for BLUETOOTH communications. By ranking the overlapping channels in this manner, a set of channels that are likely to exhibit a minimum amount of interference can be selected for BLUETOOTH communications.

This algorithm may be executed even before communications via the device's BLUETOOTH communication interface have been initiated. As such, even when per-channel interference data may not be available to the device, the present channel selection algorithm may be used to select an initial set of channels for communications that are less-likely to result in interference than an entirely random selection of channels.

Although the algorithm may be executed by a device including co-located BLUETOOTH, ZIGBEE, and WIFI communication interfaces, in an embodiment a network-based solution is provided in which data describing in-use communication channels for different communication protocols is collected from multiple devices. By analyzing data provided by multiple devices (e.g., devices that are in proximity to one another), a device can be provided a refined list of channels optimized to mitigate interference not only between communication interfaces that are co-located in a single device, but also communication interfaces that are present in the other, nearby, devices.

FIG. 1 shows an illustrative architecture 100, set in an exemplary environment 102, which includes a device 104 that can incorporate a communication subsystem configured in accordance with the present disclosure. Specifically, the communication subsystem may be configured to identify an optimized set of communication channels for transmitting and receiving data using a particular wireless communication protocol.

Device 104 may be positioned in any number of locations (e.g., ceiling, wall, in a lamp, beneath a table, on a work desk, in a hall, under a chair, etc.) within the environment 102. Device 104 is configured to communicatively couple to a number of remote entities 110 over a network 112. The remote entities 110 may include individual people, or automated and remote computer systems (not shown) that can interact with device 104. In some embodiments, remote entities 110 may comprise cloud services 116 hosted, for example, on one or more servers 118(1) . . . 118(S). These servers 118(1)-(S) may be arranged in any number of ways, such as server farms, stacks, and the like that are commonly used in data centers.

The cloud services 116 generally refer to a network accessible platform implemented as a computing infrastructure of processors, storage, software, data access, and so forth that is maintained and accessible via a network such as the Internet. Cloud services 116 do not require end-user knowledge of the physical location and configuration of the system that delivers the services. Common expressions associated with cloud services include "on-demand computing", "software as a service (SaaS)", "platform computing", "network accessible platform", and so forth.

The cloud services 116 may host any number of applications that can process input received from device 104, and produce a suitable response. Example applications might include web browsing, online shopping, banking, email, work tools, productivity, entertainment, educational, and so forth.

A user can communicate with remote entities 110 via device 104. For example, device 104 may output an audible question, "What do you want to do?" This output may represent a question from a far end talker 114, or from a cloud service 116 (e.g., an entertainment service). The user can then respond by stating a response.

Device 104 is equipped with an array 124 of microphones 126(1) . . . 126(M) to receive the voice input from the user. The microphones 126(1)-(M) are generally arranged at a first or top end of device 104. Although multiple microphones are illustrated, in some implementations, device 104 may be embodied with only one microphone.

Device 104 may further include a speaker array 128 of speakers 130(1) . . . 130(P) to output sounds. Speakers 130(1)-(P) may be configured to emit sounds at various frequency ranges, so that each speaker has a different range. In this manner, device 104 may output high frequency signals, mid frequency signals, and low frequency signals.

Device 104 may further include computing components 132 that process voice inputs received by microphone array 124, enable communication with the remote entities 110 over the network 112, and generate audio to be output by speaker array 128. Computing components 132 are generally positioned between microphone array 124 and speaker array 128, although essentially any other arrangement may be used. One collection of computing components 132 are illustrated and described with reference to FIG. 2.

Figure 2:
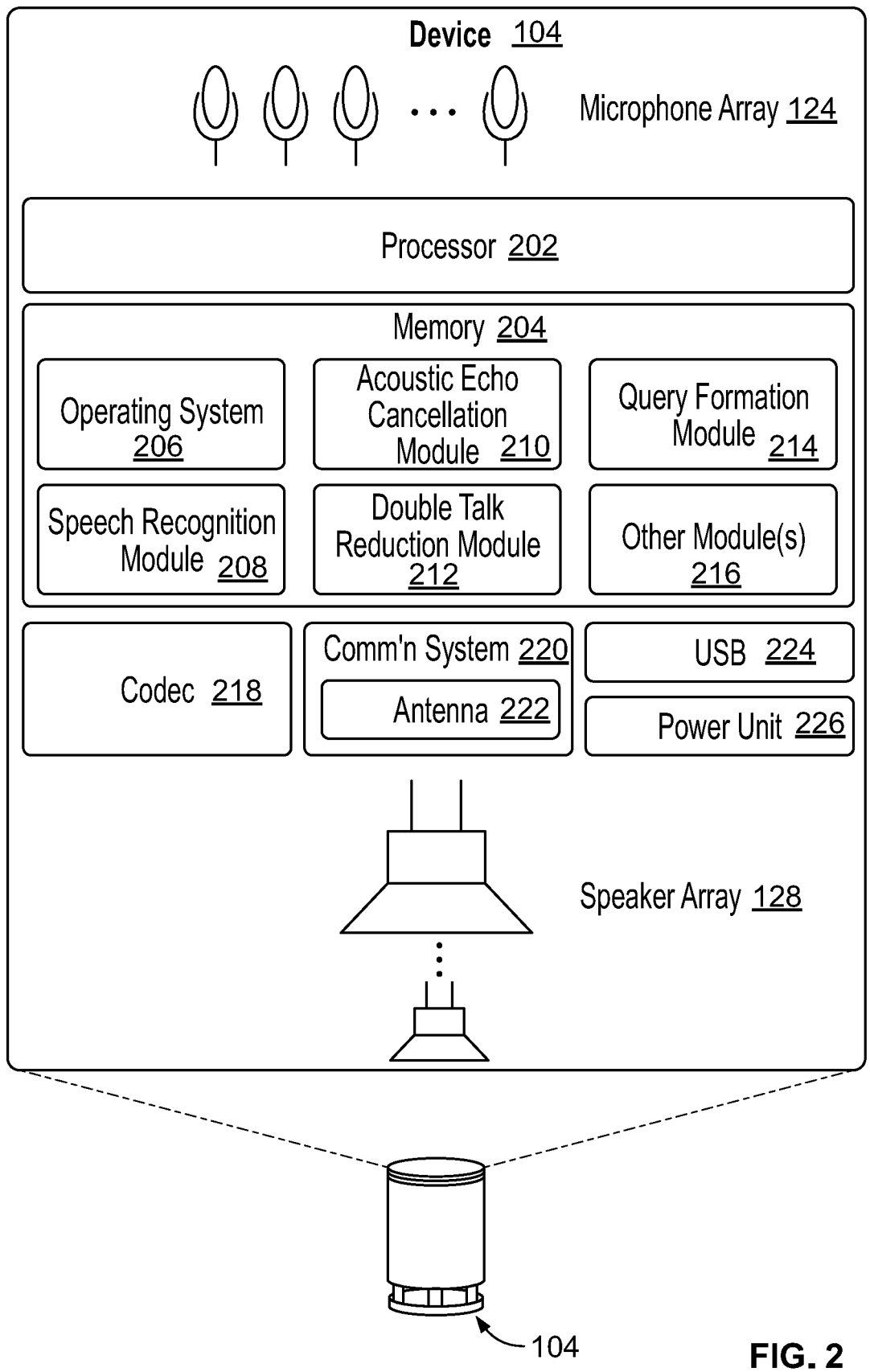
FIG. 2 illustrates example components of an example electronic device that can be used in accordance with various embodiments.

FIG. 2 shows selected functional components of device 104 in more detail. Generally, device 104 may be implemented as a standalone device that is relatively simple in terms of functional capabilities with limited input/output components, memory and processing capabilities. For instance, device 104 may not have a keyboard, keypad, or other form of mechanical input. Nor does device 104 necessarily require a display or touch screen to facilitate visual presentation and user touch input. Instead, device 104 may be implemented with the ability to receive and output audio, a network interface (wireless or wire-based), power, and limited processing/memory capabilities.

In the illustrated implementation, device 104 includes microphone array 124, speaker array 128, processor 202, and memory 204.

Memory 204 may include computer-readable storage media ("CRSM"), which may be any available physical media accessible by the processor 202 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by processor 202.

Several modules such as instructions, data stores, and so forth may be stored within the memory 204 and configured to execute on processor 202. An operating system module 206 is configured to manage hardware and services (e.g., wireless unit, USB, Codec) within and coupled to device 104 for the benefit of other modules. Several other modules may be provided to process verbal input from the user. For instance, a speech recognition module 208 provides some level of speech recognition functionality.

An acoustic echo cancellation module 210 and a double talk reduction module 212 are provided to process the audio signals to substantially cancel acoustic echoes and substantially reduce double talk that may occur. These modules may work together to identify times where echoes are present, where double talk is likely, where background noise is present, and attempt to reduce these external factors to isolate and focus on the near talker.

A query formation module 214 may also be provided to receive the parsed speech content output by the speech recognition module 208 and to form a search query or some form of request. This query formation module 214 may utilize natural language processing (NLP) tools as well as various language modules to enable accurate construction of queries based on the user's speech input.

Device 104 might further include a codec 218 coupled to the microphones of the microphone array 124 and the speakers of the speaker array 128 to encode and/or decode the audio signals. The codec 218 may convert audio data between analog and digital formats.

Device 104 includes a wireless communication system 220 coupled to an antenna 222 (which may include one or more separate antenna components) to facilitate a wireless connection to a network or one or more other remote components configured to communication with device 104. Wireless communication system 220 may implement one or more of various wireless technologies, such as WIFI, BLUETOOTH, ZIGBEE, and so on.

USB port 224 may further be provided as part of device 104 to facilitate a wired connection to a network, or a plug-in network device that communicates with other wireless networks. In addition to USB port 224, or as an alternative thereto, other forms of wired connections may be employed, such as a broadband connection, and connected to device 104 using one or more additional modules 216 that may be utilized for data transfer. A power unit 226 is further provided to distribute power to the various components on device 104.

Device 104 supports audio interactions with the user, in the form of receiving voice commands (e.g., words, phrase, sentences, etc.) from the user and outputting audible feedback to the user. Accordingly, in the illustrated implementation, there are no haptic input devices, such as navigation buttons, keypads, joysticks, keyboards, touch screens, and the like. Further there is no display for text or graphical output.

Figure 3:
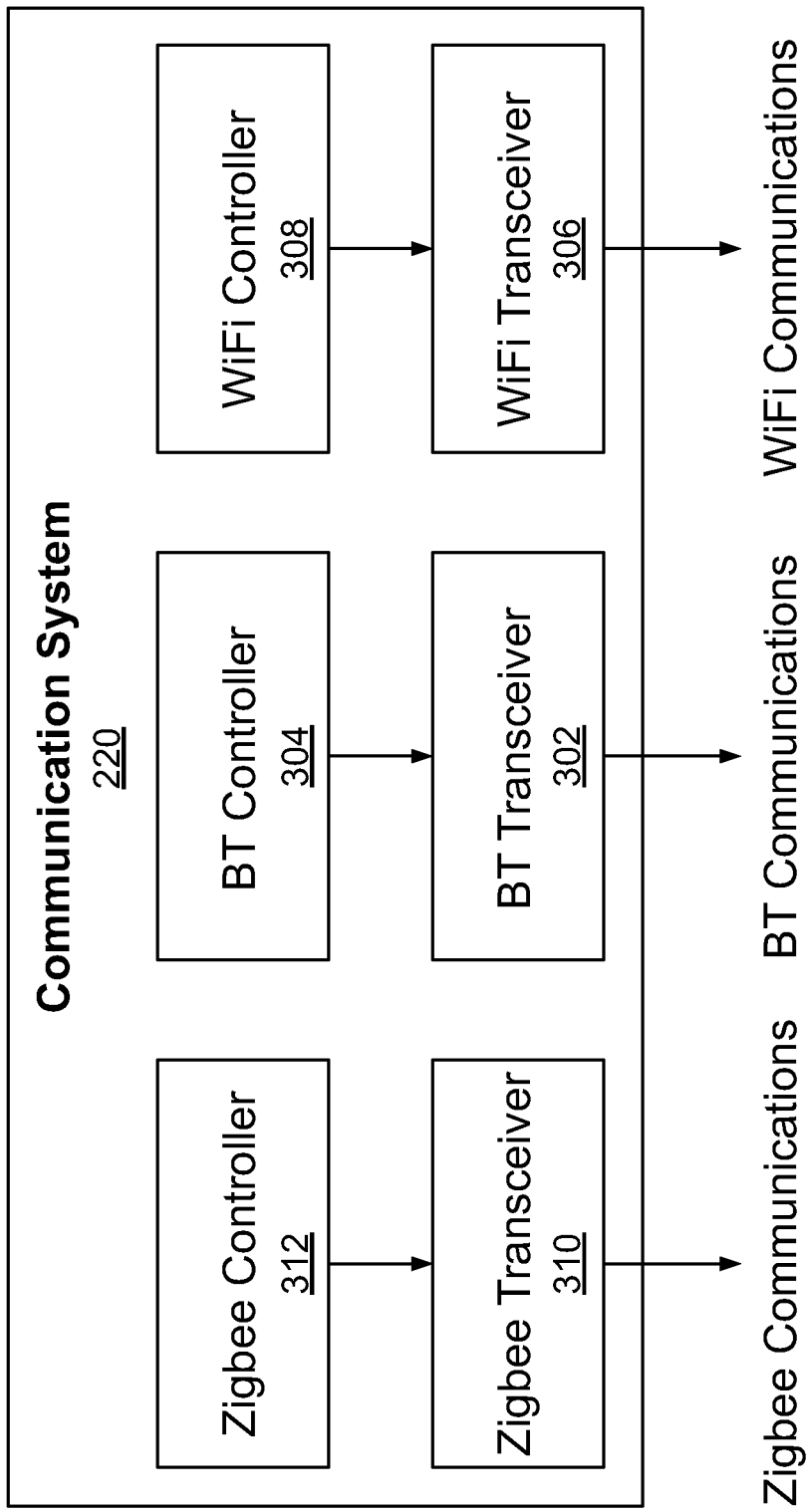
FIG. 3 is a block diagram depicting functional components of a communication system of an example device.

FIG. 3 is a block diagram depicting functional components of communication system 220 of an example device (e.g., device 104 of FIGS. 1 and 2). In this example, communication system 220 includes subsystems for transmitting, receiving, encoding and decoding BLUETOOTH, WIFI and ZIGBEE communications. Specifically, communication system 220 includes BLUETOOTH transceiver 302 that is configured to provide BLUETOOTH communication capability by transmitting BLUETOOTH packets using a suitable antenna (not shown) and receiving BLUETOOTH packets via the same antenna. BLUETOOTH controller 304 is coupled to the BLUETOOTH transceiver 302. BLUETOOTH controller 304 is configured to encode and decode BLUETOOTH communications that are either transmitted through BLUETOOTH transceiver 302 or received via BLUETOOTH transceiver 302. BLUETOOTH controller 304 is further configured to select an appropriate BLUETOOTH channel for the transmission or reception of a BLUETOOTH data packet and is configured to instruct BLUETOOTH transceiver 302 to utilize such BLUETOOTH channel when either transmitting or receiving packets. In some cases, as described herein, the selection of an appropriate channel for data transmission or reception may involve BLUETOOTH controller 304 executing one or more algorithms or routines to identify an appropriate channel.

During operation of the BLUETOOTH communication system, BLUETOOTH controller 304 may further monitor or control one or more attributes of data packets being transmitted or received via BLUETOOTH transceiver 302. For example, for data packets transmitted using a particular BLUETOOTH channel, BLUETOOTH controller 304 can set a duty cycle to be utilized when transmitting the data packet. Conversely, for data packets received by BLUETOOTH transceiver 302 in a particular channel, BLUETOOTH controller 304 can determine a received signal strength indicator (RSSI) for those communications. The RSSI is a measurement of the power of the received signal compared to background noise, which can be an indicator of how much interference is present on that particular channel.

Communication system 220 includes WIFI transceiver 306 that is configured to provide WIFI communication capability by transmitting WIFI packets using a suitable antenna (not shown) and receiving WIFI packets using the same antenna. WIFI controller 308 is coupled to the WIFI transceiver 306. WIFI controller 308 is configured to encode and decode WIFI communications that are either transmitted through WIFI transceiver 306 or received using WIFI transceiver 306. WIFI controller 308 is further configured to select an appropriate WIFI channel for the transmission or reception of WIFI data packets and is configured to instruct WIFI transceiver 306 to utilize such WIFI channel when either transmitting or receiving packets. In some cases, as described herein, the selection of an appropriate channel for data transmission or reception may involve WIFI controller 308 executing one or more algorithms or routines to identify an appropriate channel.

During operation of the WIFI communication system, WIFI controller 308 may further monitor or control one or more attributes of data packets being transmitted or received via WIFI transceiver 306. For example, for data packets transmitted using a particular WIFI channel, WIFI controller 308 can set a duty cycle to be utilized when transmitted the data packet. Conversely, for data packets received by WIFI transceiver 306 in a particular channel, WIFI controller 308 can determine an RSSI for those communications, which can be an indicator of how much interference or noise is present on that particular channel.

Communication system 220 includes ZIGBEE transceiver 310 that is configured to provide ZIGBEE communications by transmitting ZIGBEE packets using a suitable antenna (not shown) and receiving ZIGBEE packets via the same antenna. ZIGBEE controller 312 is coupled to the ZIGBEE transceiver 310. ZIGBEE controller 312 is configured to encode and decode ZIGBEE communications that are either transmitted through ZIGBEE transceiver 310 or received via ZIGBEE transceiver 310. ZIGBEE controller 312 is further configured to select an appropriate ZIGBEE channel for the transmission or reception of a ZIGBEE data packet and is configured to instruct ZIGBEE transceiver 310 to utilize such ZIGBEE channel when either transmitting or receiving packets. In some cases, as described herein, the selection of an appropriate channel for data transmission or reception may involve ZIGBEE controller 312 executing one or more algorithms or routines to identify an appropriate channel.

During operation of the ZIGBEE communication system, ZIGBEE controller 312 may further monitor or control one or more attributes of data packets being transmitted or received via ZIGBEE transceiver 310. For example, for data packets transmitted using a particular ZIGBEE channel, ZIGBEE controller 312 can set a duty cycle to be utilized when transmitted the data packet. Conversely, for data packets received by ZIGBEE transceiver 310 in a particular channel, ZIGBEE controller 312 can determine an RSSI for those communications, which can be an indicator of how much interference or noise is present on that particular channel.

Each of the communication protocols implemented by communication system 220 involves transmitting or receiving radio signals (e.g., RF signals) that are constrained to particular ranges of frequencies (i.e., bandwidths) referred to as channels. The channels for each protocol are designated within a larger bandwidth or range of frequencies allocated to the communication protocol. In some cases, the bandwidths allocated to each of the BLUETOOTH, WIFI, and ZIGBEE protocols at least partially overlap (that is, they each include some of the same frequencies). And, accordingly, different channels used by each protocol may also overlap one another.

Figure 4:
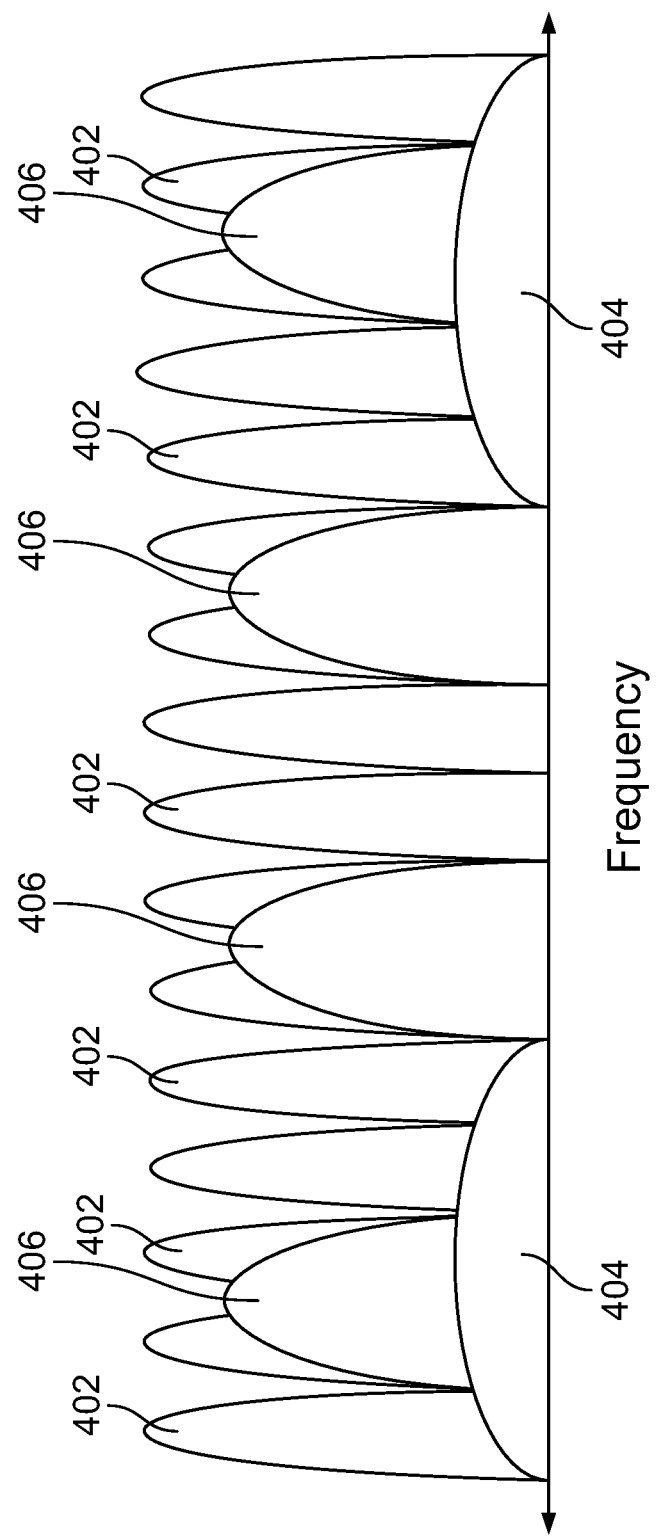
FIG. 4 is a diagram depicting overlapping communications channels used by a number of different communication protocols.

FIG. 4 is a diagram depicting overlapping communications channels used by a number of different communication protocols. Specifically, when transceivers 302, 306, and 310 of FIG. 3 are implemented as respective BLUETOOTH, WIFI, and ZIGBEE devices, the transmitted and received radio communications may share one or more of the industrial, scientific and medical (ISM) frequency bands, such as the 2.400-2.500 GHz frequency band, among others. As shown in FIG. 4, BLUETOOTH transceiver 302 may transmit and receive BLUETOOTH packets using a first set of communications channels 402, such as a set of 1 MHz Bluetooth channels. Similarly, WIFI transceiver 306 may transmit and receive WIFI packets using another set of communication channels 404, such as a set of wireless local area network (WLAN) or WIFI channels. Similarly, ZIGBEE transceiver 310 may transmit and receive ZIGBEE packets using another set of communication channels 406, such as a set of 2 MHz ZIGBEE channels. The channels allocated to each protocol can have different bandwidths and so may only partially overlap one another. To identify the channels, the channels allocated for each communication protocol are allocated channel numbers.

As is depicted in FIG. 4, the various sets of channels use portions of the shared ISM frequency band. For example, a 22 MHz WIFI channel may have a center frequency of 2.412 GHz, which may overlap, at least partially, 20 different 1 MHz BLUETOOTH channels. This potentially causes problems for both reception and transmission of WLAN and BLUETOOTH packets occurring on overlapping channels. Similarly, overlapping BLUETOOTH and ZIGBEE channels can potentially interfere with one another if data is broadcast in the overlapping channels at the same time, which may occur.

Figure 5:
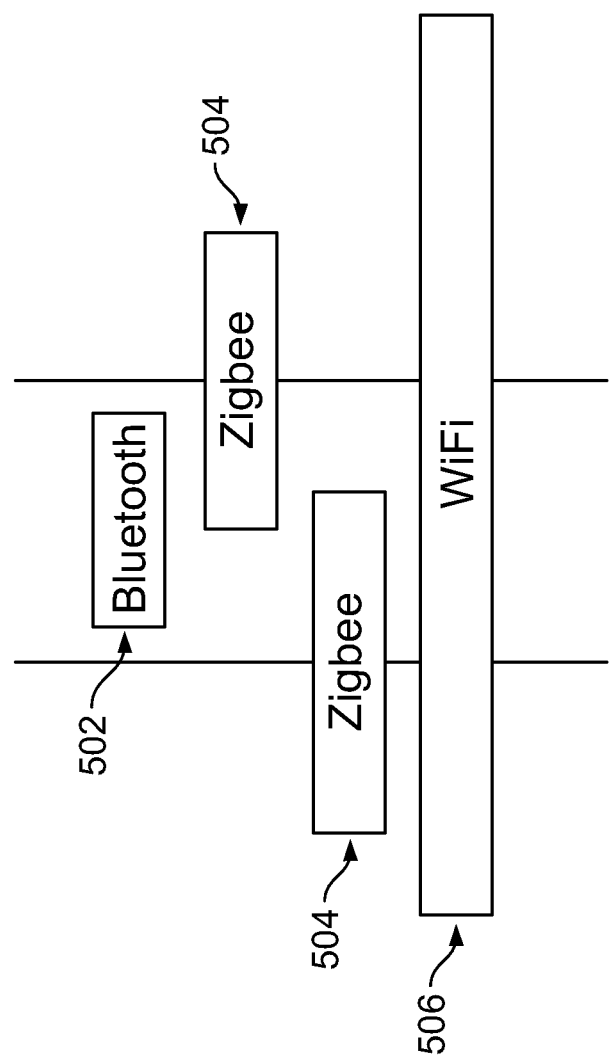
FIG. 5 is a diagram depicting data packet transmissions occurring on overlapping communications channels in the time domain.

To illustrate, FIG. 5 is a diagram depicting data packet transmissions occurring on overlapping communications channels in the time domain. As depicted, BLUETOOTH transceiver 302, WIFI transceiver 306 and ZIGBEE transceiver 310 may communicate BLUETOOTH packet 502, ZIGBEE packets 504, and WIFI packet 506 at approximately the same time using overlapping communications channels, thereby potentially creating interference for BLUETOOTH transceiver 302, WIFI transceiver 306 and ZIGBEE transceiver 310.

To reduce interference resulting from data transmissions in channels that overlap one another, an approach may be utilized to identify an optimized set of channels for data packets transmitted or received using a particular communication protocol. The optimized set of channels may include a set of channels that is less-likely to result in interference with other data transmissions than a randomly selected set of channels, for example.

The approach for selecting the optimized set of channels may be implemented, for example, by a mobile device that incorporates BLUETOOTH, WIFI, and ZIGBEE communications interfaces and that may implement WIFI, BLUETOOTH, and ZIGBEE communications protocols.

In a device with co-located (i.e., implemented within the same device) WIFI, BLUETOOTH, and ZIGBEE communications controllers, the device may communicate with each controller to determine the channels being utilized by each controller. Additionally, the device can determine the duty cycle being utilized for each in-use channel. The duty cycle describes the average power level of transmissions on a particular channel.

With the list of in-use channels and related duty cycles for each communication controller determined. The mobile device can generate a list of channels that are available for a particular communication protocol (in an embodiment, BLUETOOTH) that do not overlap the in-use channels. If the number of available (i.e., non-overlapping) channels does not meet a minimum threshold, the remaining channels that overlap, to some degree, with the in-use channels can be ranked using duty cycle information to identify a set of channels that may exhibit a minimum level of interference.

One or more of those channels that may exhibit a minimum level of interference may then be used in combination with the available channels to provide the minimum number of channels required for the desired communication protocol. By ranking the overlapping channels in this manner, a set of channels that are likely to exhibit a minimum amount of interference can be identified and utilized for data communications.

Figure 6:
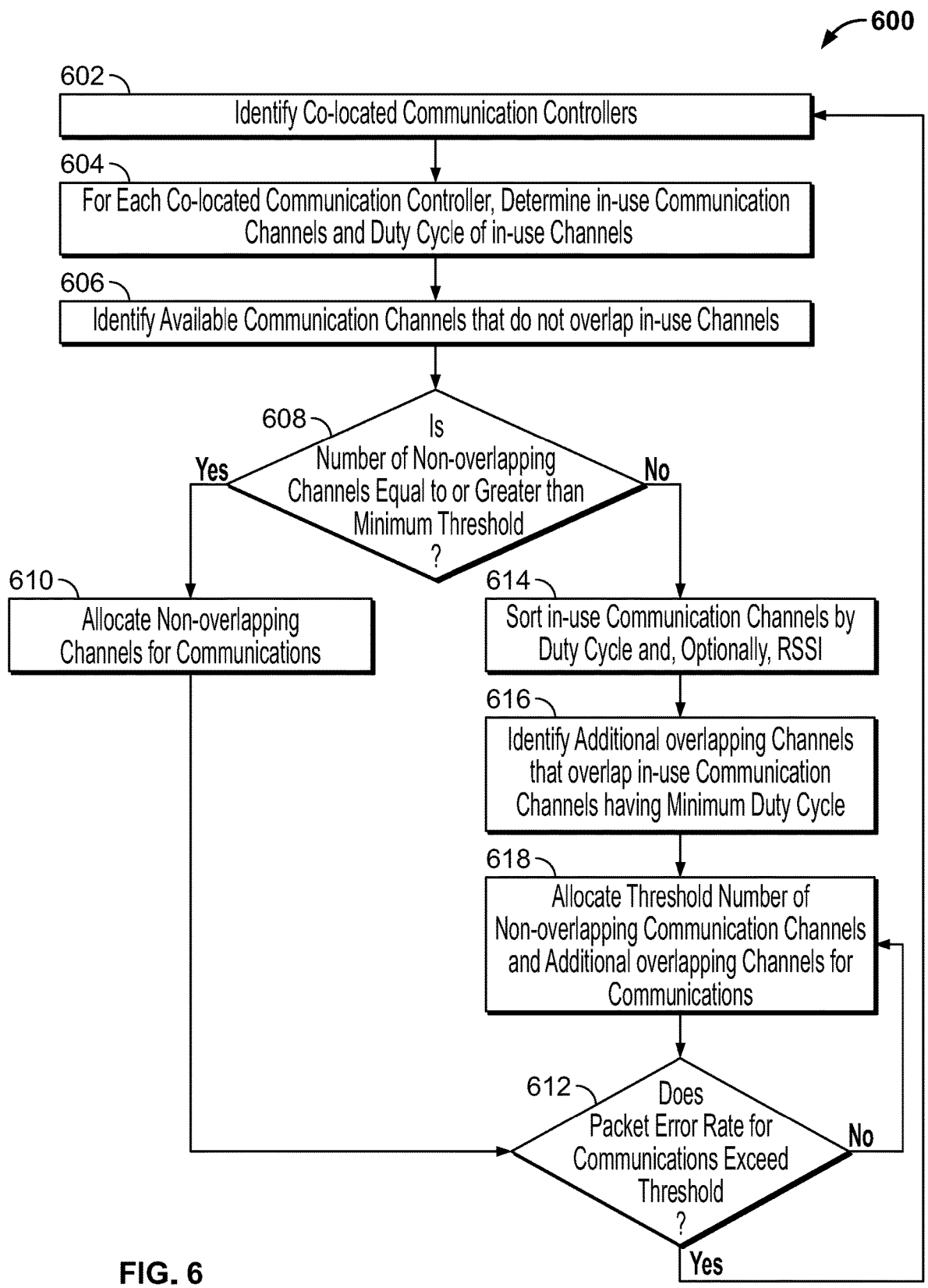
FIG. 6 is a flowchart of a method that may be implemented by a processor of an example device to identify a set of optimized channels for wireless communication.

FIG. 6 is a flowchart of method 600 that may be implemented by a processor (e.g., processor 202) of a device (e.g., device 104) to identify a set of optimized channels for wireless communication. Typically processor 202 is configured to execute instructions stored in a suitable memory of the device to enable the processor to perform the steps of method 600. In describing the method of FIG. 6, an example is provided in which the processor is implementing the method to determine a set of optimized BLUETOOTH channels for use in BLUETOOTH communications. But it is to be appreciated that the method may be utilized to determine optimized sets of communication channels for any communication protocol that employs a plurality of channels for communication, where the channels include frequencies that may overlap with those frequencies used by other communication protocols.

In this example, the device implementing method 600 includes a number of different communication controllers (e.g., BLUETOOTH, ZIGBEE, and WIFI) that are each co-located. That is, each communication controller is located within the device (e.g., by a single processor or by multiple processors implemented on the same circuit board or substrate), which can result in an increased amount of interference between the transmissions generated by each controller. Each communication controller is configured to transmit and receive encoded signals in different communication channels. In some cases, the communication channels used by each controller include frequencies that overlap one another.

In order to identify a set of optimized communication channels for use by a first communication controller (e.g., a BLUETOOTH controller), in step 602, the processor first identifies other co-located communication controllers. In this example, the processor identifies WIFI controller 308 and ZIGBEE controller 312. With the other co-located communication controllers identified, the processor, in step 604, interrogates each co-located communication controller (e.g., via an application programming interface (API) call transmitted to each communication controller) to identify the communication channels being utilized by or otherwise designated for communication by the respective communication controllers. Furthermore, for each communication controller, the processor determines the duty cycle being utilized for communications being transmitted on each channel. After step 604, for example, the processor may determine that the WIFI communication controller is using a set of WIFI channels as depicted in Table 1.

TABLE 1

| WIFI Channel | Duty Cycle |
|---|---|
| 5 | 40% |
| 7 | 35% |
| 11 | 70% |

Similarly, the processor may determine in step 604 that the ZIGBEE communication controller is using a set of ZIGBEE channels as depicted in Table 2.

TABLE 2

| ZIGBEE Channel | Duty Cycle |
|---|---|
| 13 | 55% |
| 15 | 65% |
| 17 | 80% |
| 18 | 20% |

With the list of communication channels and respective duty cycles in use by the other co-located communication controllers determined in step 604, in step 606 the processor determines a set of communication channels available for the first communication controller (in this case, a set of BLUETOOTH channels available for use by the BLUETOOTH communication controller) that do not overlap with those in-use by the co-located communication controllers. This may involve, for example, the processor determining, for each in-use communication channel (i.e., the channels listed in Table 1 and Table 2), the frequencies covered by those channels and then identifying each channel that can be used by the first communication controller that encompass or include frequencies that do not overlap with any of those of the in-use channels. For example, in order to identify the set of available communication channels, the processor may identify a set of BLUETOOTH channels whose allocated frequencies do not overlap with the frequencies allocated to any of the in-use WIFI and ZIGBEE channels.

In some cases, given a particular set of available and non-overlapping channels, the processor may rank the available channels to determine which of the available channels are least likely to generate interference. This may involve the processor accessing a look-up table (e.g., stored in memory 204 of device 104) that identifies, based on the set of in-use WIFI and ZIGBEE channels, which of the available channels are least likely to generate interference. To generate such a look-up table, an example device could be characterized in a testing environment to identify, for each possible combination of in-use WIFI and ZIGBEE channels, which available (i.e., non-overlapping) BLUETOOTH channels are least likely to cause interference with the in-use WIFI and ZIGBEE channels. With such a device characterized, a table may be installed into a memory of the device (e.g., memory 204) that identifies, for a particular set of in-use WIFI and ZIGBEE channels, which non-overlapping BLUETOOTH channels are least likely to cause interference with the in-use channels.

Some communication protocols require a minimum number of available channels in order to operate. This is true of BLUETOOTH, which, in some implementations, may require a minimum threshold of 20 available communication channels.

Accordingly, in step 608 the processor determines whether the number of non-overlapping communication channels (e.g., non-overlapping BLUETOOTH channels)

identified in step 606 is equal to or greater than a minimum threshold number of channels required for communication using the protocol. If so, the set of non-overlapping channels identified in step 606 is allocated for communication using the protocol in step 610.

Because the set of channels identified in step 606 do not overlap those that are in-use by the co-located communication controllers, the set of channels identified in step 606 is unlikely to exhibit substantial interference with those channels that are already in-use. As such, the set of channels identified in step 606 may be considered an optimized set of communication channels for the communication protocol. After the set of non-overlapping channels is allocated for communication by the first communication controller (e.g., the BLUETOOTH controller), the method moves to step 612.

In step 612, communications occurring via the set of channels allocated in step 610 to the first communication controller are monitored to determine levels of interference on those channels. Specifically, packet error rates (PERs) may be measured for each of the allocated communication channels. If the PER for each communication channel remains below a predetermined threshold (e.g., a PER threshold in the range of 1% to 10%), the first communication controller will continue using the set of channels allocated in step 610 for communications. But if the PER for a channel exceeds the threshold PER (e.g., a maximum allowable PER, which indicates that the channel is becoming less effective for communication) defined for communications by for the first controller, possibly as the result of one of the co-located communication controllers changing to a different channel from those identified in step 602), the method returns to step 602 and repeats, with a new set of optimized communication channels being identified for the first communication controller.

Returning to step 608, if the number of available and non-overlapping channels identified in step 606 does not meet or exceed the minimum number required for communications by the first communication controller, additional communication channels are identified.

Accordingly, in step 614 the processor generates a list of the in-use communication channels identified in step 604 that is sorted by the duty cycle associated with each in-use communication channel. In-use communication channels that have a higher duty cycle can be more likely to interfere with other channels with overlapping frequencies. For example, with the in-use communication channels depicted in Table 1 and Table 2, the processor may generate a sorted list of in-use communication channels as depicted in Table 3, where channels having a lower duty cycle are sorted towards to the top of the table.

TABLE 3

| WIFI Channel | ZIGBEE Channel | Duty Cycle | Overlapping Bluetooth Channels |
|---|---|---|---|
|  | 18 | 20% | 12 |
| 7 |  | 35% | 13, 14, 15 |
| 5 |  | 40% | 5, 6, 7 |
|  | 13 | 55% | 5 |
|  | 15 | 65% | 10 |
| 11 |  | 70% | 25, 26, 27 |
|  | 17 | 80% | 23 |

In some embodiments, the in-use communication channels may further be ranked by other characteristics indicative of a likelihood of interference. For example, an RSSI value for each in-use channel can be determined. The greater the RSSI value for the channel, the increased likelihood of successful receipt of transmission on that channel, which is an indicator of lower levels of interference. Accordingly, the in-use channels could be ranked by both duty cycle and RSSI. The in-use channels may be sorted first by duty-cycle (in which lower duty-cycles represent channels least likely to cause interference) and then second by RSSI for each channel (in which a higher RSSI value for a channel indicates the channel is less likely to cause interference). In still other embodiments, the in-use channels could be further ranked based upon other indicators of channel quality, such as packet error rate for the channel, retry rate for the channel, and the like.

With the in-use communication channels having the lowest or minimum associated duty cycles identified (and, optionally, the highest associated RSSI value) and sorted, in step 618 the processor can identify additional communication channels for use by the first communication controller to meet the threshold number required for communications. Even though these additional communication channels will overlap, to so degree, in-use channels, by selecting channels that overlap with in-use channels with the lowest available duty cycles (and, optionally, the highest associated RSSI), the likelihood (and severity) of interference may be minimized.

When identifying the additional channels for the first communication controller (e.g., additional BLUETOOTH channels), the processor identifies channels that overlap those in-use channels with the lowest duty cycle (in this example, BLUETOOTH channels overlapping in-use ZIGBEE channel 18) and, optionally, highest RSSI. If additional channels are needed, the processor will then identify channels for use by the first communication controller that overlap in-use channels having the second-lowest duty cycle, and so on, until the required number of channels have been identified.

For example, if step 606 identified 15 non-overlapping channels, but the threshold number required for communication is 20, the processor, in step 616 will identify 5 additional channels for the first communication controller that overlap the in-use channels with lowest duty cycles. In the example ranking of Table 3, the 5 additional BLUETOOTH channels would include BLUETOOTH channels 12, 13, 15, 16, and 5.

In some embodiments, where there are multiple overlapping channels that may be selected as additional channels for the first communication controller, the overlapping channels may themselves be prioritized. For example, in the second row of Table 3, there are three candidate BLUETOOTH channels (13, 14, and 15). But each of these BLUETOOTH channels overlap a different portion of WIFI channel 7. Because different regions of WIFI channel 7 may cause different amounts of interference, the overlapping BLUETOOTH channels 13, 14, and 15 may not experience similar amounts of interference. In some cases, channels that overlap at the edges of another channel may experience less interference than a channel that overlaps a center frequency of another channel, for example. Accordingly, if BLUETOOTH channel 15 overlaps an edge of WIFI channel 7, while BLUETOOTH channels 13 and 14 are closer to the center of WIFI channel 7, BLUETOOTH channel 15 may be prioritized over BLUETOOTH channels 13 and 14 when selecting channels for communication.

With a total of 20 channels identified (the threshold number of channels required for communications), in step 618 that set of 20 channels (including non-overlapping and overlapping channels) is allocated to the first communication controller for use in transmitting and receiving data packets. In an embodiment, the first communication controller may be instructed to use a maximum or highest-available transmission power when transmitting data using any of the at least partially overlapping communication channels identified in step 616. The maximum or highest transmission power is a maximum power that may be utilized by the first communication controller according the communication protocol (e.g., BLUETOOTH) being implemented by the first communication controller. The first communication controller may be forced or required to use such a maximum transmission power when transmitting data using any of the overlapping communication channels in an attempt to improve the likelihood of successful receipt of transmissions on those channels because those channels may be more likely to experience interference than non-overlapping channels.

With the requisite number of communication channels allocated for communications, the method moves to step 612 with the processor monitoring communications occurring via the set of channels allocated in step 618. If the PER for each communication channel remains below a threshold (e.g., a typical threshold may be in the range of 1% to 10%), the first communication controller will continue using the set of channels allocated in step 618 for communications. But if the PER for a channel exceeds the threshold PER (indicating that the channel is becoming less effective for communication, possibly as the result of one of the co-located communication controllers using a different channel from those identified in step 602), the method returns to step 602 and repeats, with a new set of optimized communication channels being identified for the first communication controller. In that case, the processor may instruct one or more communication controller in the device to stop or cease communications (including transmissions and receptions of data) using the communication channels allocated in either step 610 or 618. In some other embodiments, other detected conditions, such a change in configuration of one or more of the device's communication controllers may trigger an exit to step 612 and re-execution of method 600. For example, if the processor detects that one or more controller of the device (e.g., ZIGBEE controller 312 or WIFI controller 308) has begun using a different set of communication channels (e.g., ZIGBEE or WIFI channels), the processor may re-execute the method of FIG. 6 in order to determine a new optimized set of BLUETOOTH channels based upon the reconfigured ZIGBEE and WIFI controllers. For example, after executing method 600 an initial time (and determining an initial set of channels being utilized by ZIGBEE controller 312 and WIFI controller 308), the processor may, at a later time, again determining the set of channels being used by ZIGBEE controller 312 and WIFI controller 308. If the set of channels has changed (e.g., the new set of channels includes channels being utilized that were not in the set of channels being used when method 600 was originally executed), the processor can determine that ZIGBEE controller 312 and WIFI controller 308 is now utilizing one or more new channels for communications, which could negatively affect the performance of communications on channels being utilized by BLUETOOTH controller 304)—one or more of the new channels being utilized by either ZIGBEE controller 312 and WIFI controller 308 could overlap an interference with the channels being utilized by BLUETOOTH controller 304. In that case, the change of configuration of a controller may be an event that, upon being detected by the device's processor, causes re-execution of method 600. In some embodiments, method 600 may be re-executed periodically, even if another triggering event is not detected (e.g., a PER exceeding a threshold or a communication controller changing configuration). For example, method 600 may be re-executed at regular intervals, such as every 10 or 60 seconds, or some other time period.

Although an example implementation of method 600 is described in which an optimized set of communication channels is determined for a BLUETOOTH communication controller, it should be understand that the method may be used to identify optimized sets of communication channels for other types of communication controllers implementing different communication protocols. In a device having two or more communication controllers (i.e., any combination of BLUETOOTH, WIFI, ZIGBEE, etc.) method 600 may be used to determine a set of optimized communication channels for use by one of those communication controllers. The method generally involves determining which channels are being used or designated for communications by the other communication channels in the device and their respective duty cycles and then, based upon that information, identifying a set of communication channels for the desired communication controller least likely to exhibit interference with those in-use channels. According, in a device with BLUETOOTH and WIFI communication controllers, method 600 may be utilized to determine an optimized set of channels for the WIFI communication controller based upon data describing the set of BLUETOOTH channels being utilized by the BLUETOOTH communication controller.

As described above, method 600 of FIG. 6 may be used to identify an optimized set of communication channels for a first communication controller that is co-located with a number of other communication controllers. Typically, co-located communication controllers are located within the same device (e.g., device 104 of FIGS. 1 and 2) and, given their proximity to one another, may represent primary sources of RF interference. But in some cases, other communication controllers that are operating to transmit and receive data in other nearby or proximate devices can also represent sources of interference. Although those communication controllers are not necessarily co-located in a single device, the RF transmissions originating from those other nearby devices could represent significant sources of interference.

Accordingly, an embodiment of the present disclosure uses a communications network to gather channel mappings from a number of different devices, where the channel mappings of each device identify the communication channels being utilized or designated for communication by the various communication controllers of each device, as well as attributes of each of those in-use communication channels such as associated duty cycle, RSSI, PER, and the like. Those channel mappings are accumulated at a remote processing or computer system.

Then, for a particular device, the remote computer system can identify the channel mappings of other nearby devices that have been uploaded via the communications network. As described below, those other channel mappings may be used to identify an initial set of optimized communication channels for use by the device, or to optimize an existing channel mapping of the device.

Figure 7:
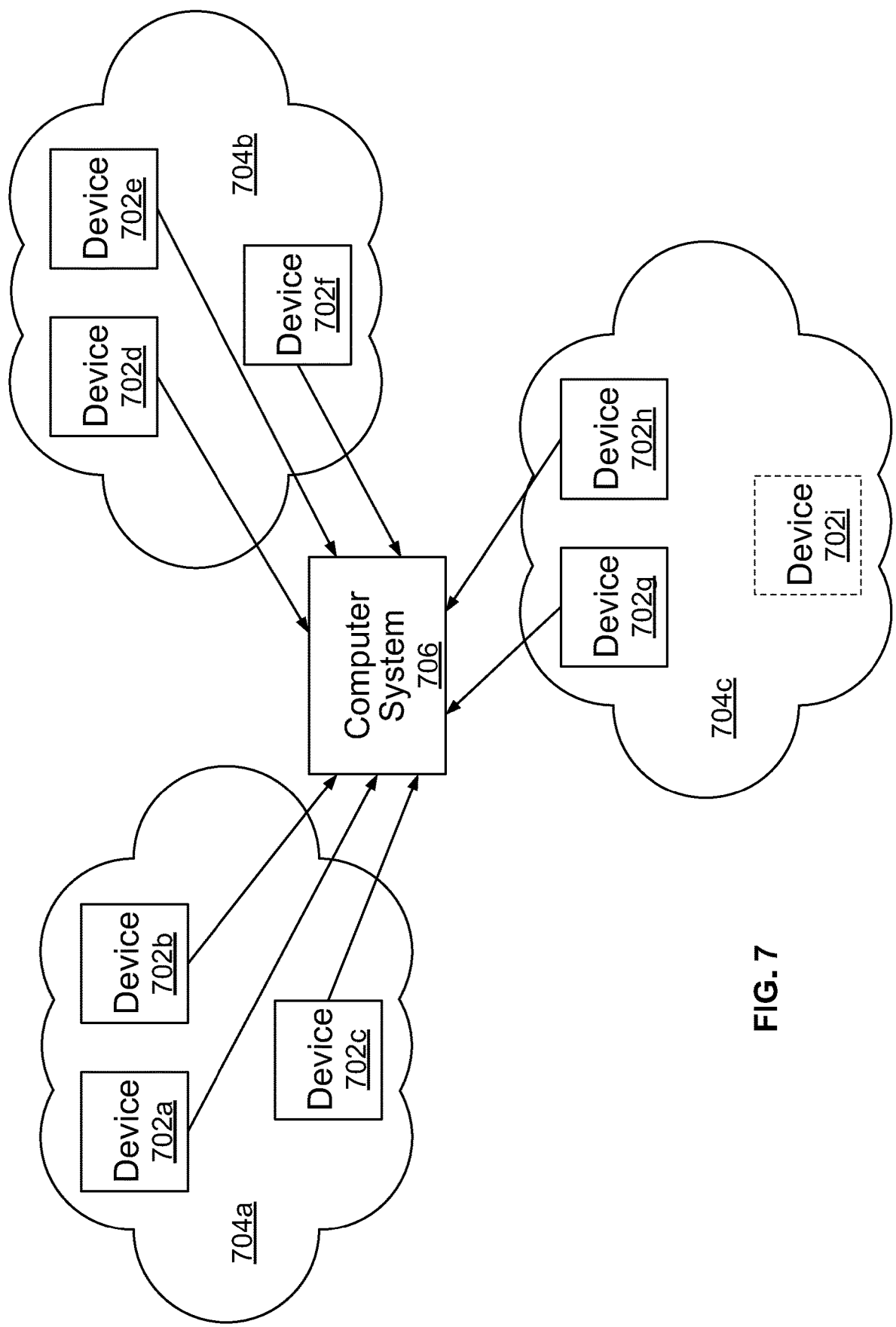
FIG. 7 is a block diagram depicting an environment in which a network-based approach for determining an optimized set of communication channels for a particular device may be utilized.

FIG. 7 is a block diagram depicting an environment in which a network-based approach for determining an optimized set of communication channels for a particular device may be utilized. As depicted, an example environment includes a number of devices 702 (including devices 702a-702i). Each device 702 is configured to communicate using one or more wireless communication protocols. As such, each device 702 includes one or more communication controllers (e.g., BLUETOOTH, ZIGBEE, or WIFI controllers) to transmit and receive messages and encode and decode the same. For example, devices 702 may each include a communication system configured in accordance with or similarly to communication system 220 depicted in FIG. 3.

Each device 702 may be organized into groups 704 of devices 702. For example, a number of devices 702 owned or operated by the same individual (or family) could be arranged into a single group 704. Devices 702 in the same group may be associated with the same unique universal identification (UUID), for example.

Each device 702 is configured to communicate with a remote computer system 706 via a wired or wireless data connection, such as via a local area network (LAN) or the Internet. The remote computer system 706 may include a number of networked cloud services hosted, for example, on one or more servers that are accessible by remote devices 702. The servers may be arranged in any number of ways, such as server farms, stacks, and the like that are commonly used in data centers. The remote computer system 706 may generally refer to a network accessible platform implemented as a computing infrastructure of processors, storage, software, data access, and so forth that is maintained and accessible via a network such as the Internet. Services implemented by the remote computer system 706 may not require end-user knowledge of the physical location and configuration of the system that delivers the services. The services implemented by the remote computer system 706 may process data received from a number of remote devices. Alternatively, remote computer system 706 may be a network controller or manager configured to modify the network configurations of one or more of devices 702.

Each device 702 is configured to upload a channel mapping to computer system 706. For a particular device 702, the device's channel mapping identifies a listing of all communication channels in-use by that device's various communication controllers (e.g., BLUETOOTH, ZIGBEE, and/or WIFI), as well as information describing those communication channels, such as a duty cycle used when transmitting via each communication channel, an RSSI for transmissions received via each channel, and a packet error rate on each channel. Table 4, below, shows a portion of an example channel mapping for an example device 702.

TABLE 4

| Channel Type | Channel Number | Duty Cycle | RSSI | PER |
|---|---|---|---|---|
| ZIGBEE | 18 | 20% | −75 | .07% |
| ZIGBEE | 13 | 35% | −20 | .06% |
| WIFI | 7 | 40% | −33 | .02% |
| WIFI | 5 | 55% | −37 | .04% |
| BLUETOOTH | 25 | 65% | −55 | .08% |
| BLUETOOTH | 23 | 70% | −8 | .10% |

When uploading the channel mapping of a particular device 702, the device 702 may provide additional information to assist computer system 706 in identifying the device 702. For example, the device 702 may provide a unique identifier (e.g., a serial number) to identify the device 702, as well as an identification of the group 704 to which the device 702 belongs.

Because proximity of devices 702 may increase the likelihood of interference, a device 702 may also provide an identification of devices that are in-communication with device 702, or that device 702 has detected in proximity to device 702. As part of the various communication protocols implemented by device 702, device 702 may detect beacon signals transmitted from other nearby devices, where the beacon signals include an identification (e.g., a name) of the nearby device. Examples of such devices may include speaker systems, televisions, thermostats, mobile devices, laptops and desktop computers, wearable devices, network routers, computer servers, and the like. In an embodiment, the other nearby devices may be identified by a media access control (MAC) address of the device. The device 702 may be configured to upload the identifications of nearby devices to remote computer system 706.

When identifying nearby devices, a device 702 may also indicate an RSSI for of communications (e.g., broadcast signals or other transmissions) from the nearby devices detected by device 702. The RSSI is an indicator of signal strength (which may be measured in decibels (dB)), where the proximity of the nearby devices may be indicated by the RSSI value. A higher RSSI can indicate greater proximity. Table 5, below, illustrates an example report of nearby devices that may be transmitted by each device 702 to remote computer system 706.

TABLE 5

| Nearby Device ID | RSSI (dB) |
|---|---|
| 00-1C-22-01-23-45 | −75 |
| 00-14-12-01-23-45 | −20 |
| 00-14-22-31-23-45 | −33 |
| 00-0E-22-01-D3-45 | −37 |
| 00-14-FF-01-23-45 | −55 |

In some embodiments, devices 702 may also provide location information, such as global positioning system (GPS) coordinates identifying a location of the device 702.

Referring to FIG. 7, for example, each of devices 702a-702h may be devices 702 that have been operating for some time, all have established channel maps, and have all reported their respective UUIDs, channel maps (e.g., Table 4), and nearby device listings (e.g., Table 5) to remote computer system 706. Remote computer system 706 includes a suitable database repository (e.g., a distributed database system) to store the information uploaded by devices 702 and process and analyze the same.

In the environment depicted in FIG. 7, device 702i is a newly-joined device (as indicated by its dashed box). For example, device 702i may have recently been powered-up or setup to connect to the network that is in communication with remote computer system 706. Because device 702i is a new device, device 702i does not have a configured channel mapping enabling device 702i to communicate with other devices in the network. Using conventional approaches, device 702i would be required to try random channel selection for each of its communication controllers to eventually identify channels suitable for communication. But in the present disclosure, device 702i instead transmits a request to computer system 706 for an initial channel mapping enabling relatively efficient and low-error-rate communications with other nearby devices 702.

Figure 8:
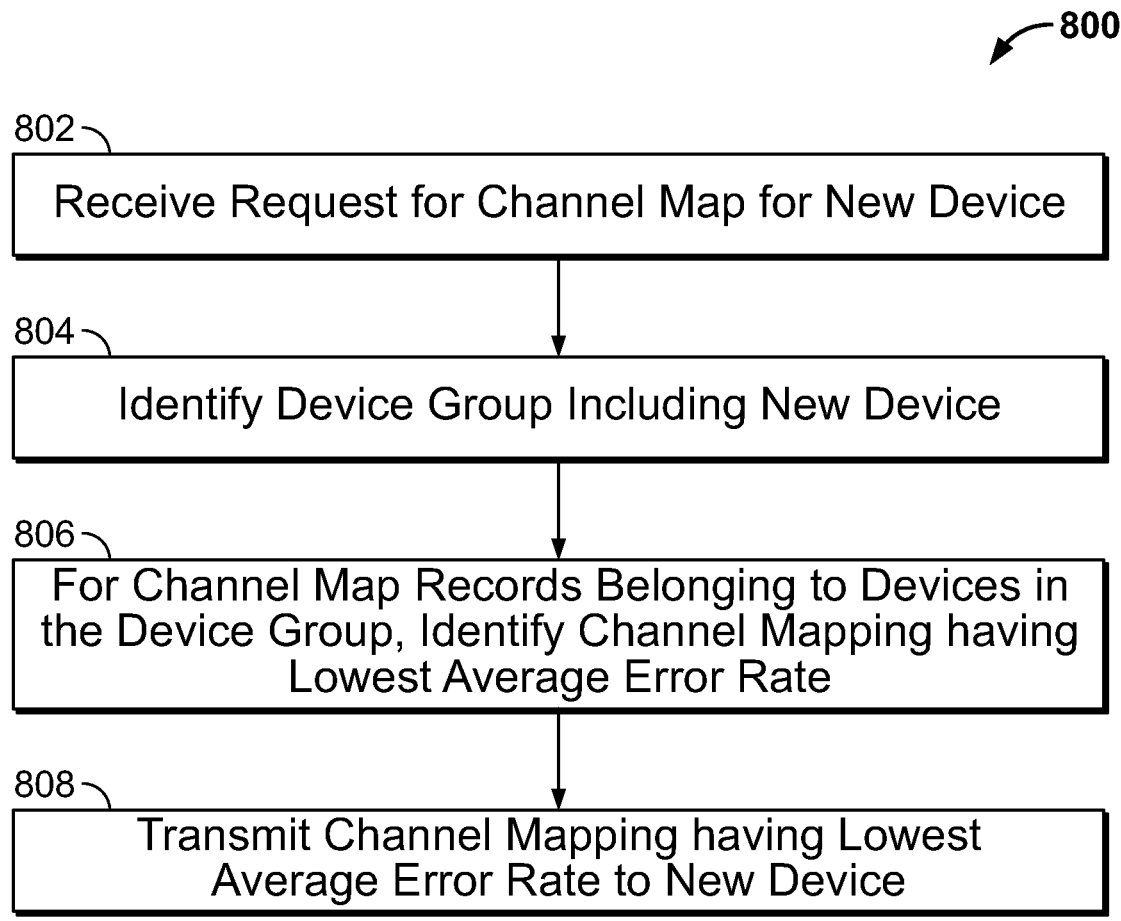
FIG. 8 is a flowchart depicting a method implemented by a remote computer system upon receiving a request from a mobile device for an initial channel mapping.

FIG. 8 is a flowchart depicting method 800 implemented by remote computer system 706 upon receiving a request from a new device 702 (i.e., device 702i) for an initial channel mapping.

In step 802, remote computer system 706 receives the request for a channel mapping from device 702i. The request may identify device 702*i*, as well as the group 704*c* to which device 702*i* belongs. At this point, device 702*i* has only recently joined the network (i.e., device 702*i* is a new device) and so device 702*i* does not upload a channel mapping or a description of nearby devices.

In step 804, remote computer system 706 identifies the group to which device 702*i* belongs. The group may be determined, as described above, based upon a QUID provided by device 702*i* when transmitting the request for a channel mapping to remote computer system 706. In other embodiments, however, the group may be identified in any suitable manner, such as based upon a user ID provided as part of the original channel mapping request, or any other information describing device 702*i* transmitting the request.

In step 806, remote computer system 706 identifies the channel mappings provided by other devices 702 belonging to the same group 704*c* as the new device 702*i*. Because devices 702 that belong to the same group tend to be operated by the same user, it is likely that the devices are all in proximity to one another. For example, a particular user may have a smart phone, laptop computer, and tablet, all of which may be located within the same residence or office and may have all uploaded their own channel mappings to remote computer system 706. Because the devices 702 belonging in a single group tend to be in proximity to one another, a channel map that results in a relatively low error rate for one device in the group may also similarly result in a low error rate for the other device in the group.

As such, in step 806, after retrieving all channel maps for devices 702 belonging to the same group as device 702*i*, remote computer system 706 identifies the channel mapping having the lowest average packet error rate. This may involve, for example, calculating an average of the packet error rates for each channel across all protocols identified in the channel mapping.

In step 808, the channel mapping having the lower average error rate is transmitted by remote computer system 706 to device 702*i* and device 702*i* can setup its communication controller to utilize the channels listed in the transmitted channel mapping.

In some cases, the channel mapping provided by remote computer system 706 may identify channels for communication protocols that are not implemented by device 702*i* (i.e., device 702*i* does not include a communication controller configured to communicate using the protocol). For example, the channel mapping may include a listing of ZIGBEE channels, but device 702*i* may not include a ZIGBEE communication controller. In that case, device 702*i* may be configured to simply ignore channels listed in the channel mapping for not-implemented communication protocols.

In some other cases, the channel mapping may not include a listing of optimized communication channels for a protocol that is implemented by device 702*i*. For example, device 702*i* may include a ZIGBEE communication controller, but the optimized channel mapping may only include listings of optimized WIFI and BLUETOOTH channels. In that case, device 702*i* may utilize the channels listed in the channel mapping for protocols that are implemented by device 702*i* and may use conventional initiation protocols to setup channels for the protocol for which no channels were listed in the channel mapping.

The channel mappings uploaded to remote computer system 706 may also be utilized to optimize or improve the channel mappings of devices 702 that have already configured all communication controllers with sets of communication channels.

Figure 9:
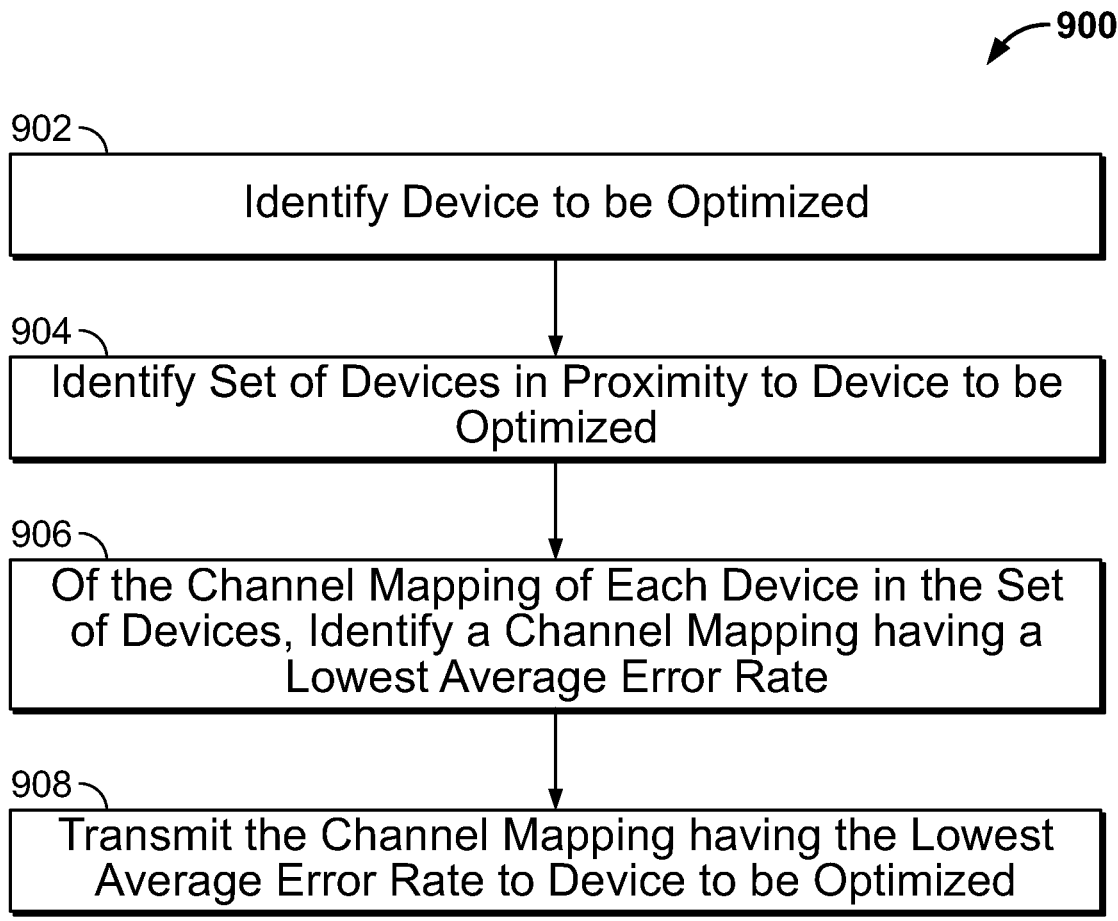
FIG. 9 is a flowchart depicting a method for a remote computer system to provide an optimized channel mapping to a mobile device.

FIG. 9 is a flowchart depicting method 900 for remote computer system 706 to provide an optimized channel mapping to a device 702 in communication with remote computer system 706. In step 902, remote computer system 706 identifies a device 702 (e.g., device 702*a*) having a channel mapping to be optimized. This may involve remote computer system 706 specifically receiving a request from device 702*a* for an optimized channel mapping. Alternatively remote computer system 706 could monitor the uploaded channel maps from devices 702 and determine that device 702*a* is experiencing a PER on one or more channels that exceeds a predetermined threshold.

Having identified device 702*a*, in step 904 remote computer system 706 identifies a number of other devices 702 that are in proximity to device 702*a*. This may involve remote computer system 706 first identifying the set of nearby devices to device 702*a*. As mentioned above, device 702*a* may report this information in a manner formatted in accordance with Table 5, above. Remote computer system 706 then identifies other devices 702 that have uploaded nearby device reports indicating that they are nearby one or more devices that appear in device 702*a*'s report. The other devices 702 may be considered to be nearby devices if they report observing messages (e.g., beacon signals) transmitted by the same devices as those observed by the device 702 being optimized or if the devices 702*s* are connected to or can observe the same networks, for example. In an embodiment, devices 702 may be determined to be nearby one another if the devices 702 detect other devices having the same identification or name (e.g., if the various devices 702 have received beacon messages from devices having the same MAC address) and the RSSI of the beacon signals received by each device 702 are within some threshold (e.g., 10 dB) of one another. Given that they are nearby, the channel mappings of the other nearby devices 702 can be used to generate an optimized channel mapping for devices 702 in that particular area.

Remote computer system 706 then retrieves the channel mappings for the identified nearby devices 702. In step 906, remote computer system 706 analyzes the channel mappings and identifies the channel mapping having the lowest average packet error rate. This may involve, for example, calculating an average of the packet error rates for each channel across all protocols in the channel mapping.

In step 908, the channel mapping having the lower average error rate is transmitted by remote computer system 706 to device 702*a* and device 702*a* reconfigures the device's communication controllers to utilize the channels listed in the channel mapping received from remote computer system 706.

In some cases, the channel mapping provided by remote computer system 706 may identify channels for communication protocols that are not implemented by device 702*a* (i.e., device 702*a* does not include a communication controller configured to communicate using the protocol). For example, the channel mapping may include a listing of optimized ZIGBEE channels, but device 702*a* may not include a ZIGBEE communication controller. In that case, device 702*a* may be configured to simply ignore channels listed in the channel mapping for not-implemented communication protocols.

In some other cases, the channel mapping may not include a listing of optimized communication channels for a protocol that is implemented by device 702*a*. For example, device 702*a* may include a ZIGBEE communication controller, but the optimized channel mapping may only include listings of optimized WIFI and BLUETOOTH channels. In that case, device 702*a* may utilize the channel listed in the channel mapping for protocols that are implemented by device 702*a* and may use conventional initiation protocols to setup channels for the protocol for which no channels were listed in the channel mapping.

In some other embodiments, the channel mappings uploaded to remote computer system 706 may also be utilized to generate an optimized channel mapping, where the individual channels that are included in the optimized channel mapping are selected based upon existing channel mappings that have been uploaded by various devices 702 to remote computer system 706.

Figure 10:
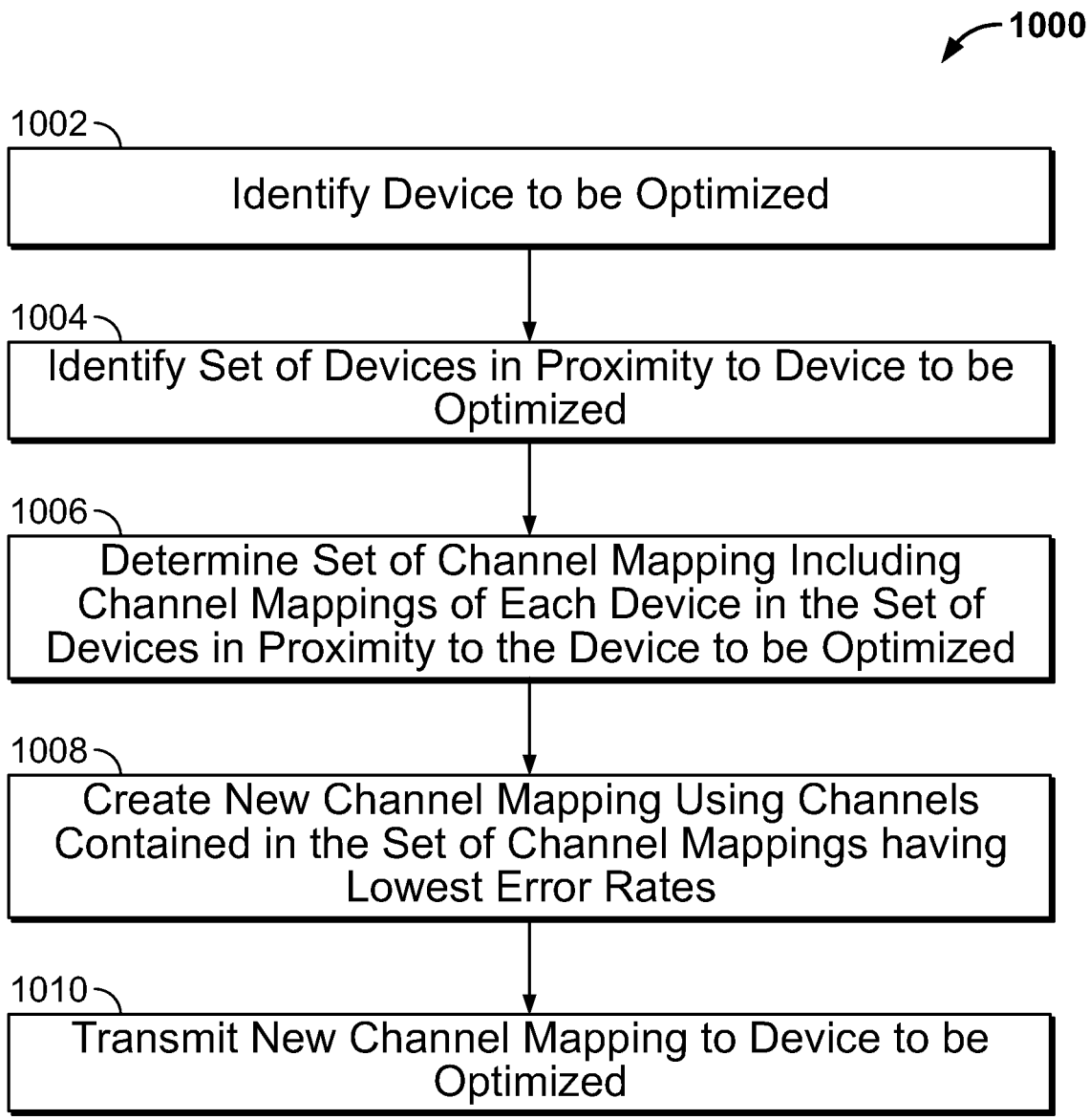
FIG. 10 is a flowchart depicting an alternative method for a remote computer system to provide an optimized channel mapping to a mobile device.

To illustrate, FIG. 10 is a flowchart depicting method 1000 for remote computer system 706 to provide an optimized channel mapping to a device 702 (e.g., device 702*a*) in communication with remote computer system 706. In step 1002, remote computer system 706 identifies device 702*a* having a channel mapping to be optimized. This may involve remote computer system 706 specifically receiving a request from device 702*a* for an optimized channel mapping. Alternatively remote computer system 706 could monitor the uploaded channel maps from device 702*a* and determine that the device is experience a PER on one or more channels that exceeds a predetermined threshold.

Having identified device 702*a*, in step 1004 remote computer system 706 identifies a number of other devices 702 that are in proximity to device 702*a* to be optimized. This may involve remote computer system 706 first identifying the set of nearby devices detected by device 702*a*. As mentioned above, device 702*a* may report this information in a manner formatted in accordance with Table 5, above. Remote computer system 706 then identifies other devices 702 that have uploaded reports indicating that they have detected one or more devices that appear in device 702*a*'s nearby device report. The other devices 702 may be considered to be nearby devices if they report observing messages (e.g., beacon signals) transmitted by the same devices as those observed by device 702*a* being optimized. In some embodiments, the listing of other, nearby devices 702 identified by remote computer system 706 may only include devices 702 that belong to the same group 704 as device 702*a*. Given that they are nearby, the channel mappings of the other nearby devices 702 can be used to generate an optimized channel mapping for that particular area.

In step 1006, remote computer system 706 then retrieves the channel mappings for the identified nearby devices 702. Table 6, below, illustrate a set of channel mappings that may be retrieved for the nearby devices.

TABLE 6

| Device ID | Channel Number | Channel Type | Duty Cycle | RSSI | PER |
|---|---|---|---|---|---|
| ID:123 | ZIGBEE | 18 | 20% | −75 | .07% |
| ID:123 | ZIGBEE | 13 | 35% | −21 | .06% |
| ID:123 | WIFI | 9 | 42% | −37 | .02% |
| ID:123 | WIFI | 10 | 56% | −33 | .04% |
| ID:123 | BLUETOOTH | 26 | 62% | −51 | .08% |
| ID:123 | BLUETOOTH | 24 | 79% | −7 | .10% |
| ID:234 | ZIGBEE | 18 | 23% | −73 | .07% |
| ID:234 | ZIGBEE | 15 | 21% | −27 | .03% |
| ID:234 | WIFI | 2 | 43% | −31 | .02% |
| ID:234 | WIFI | 3 | 52% | −34 | .04% |
| ID:234 | BLUETOOTH | 25 | 68% | −54 | .08% |
| ID:234 | BLUETOOTH | 23 | 71% | −5 | .10% |
| ID:345 | ZIGBEE | 11 | 14% | −38 | .09% |
| ID:345 | ZIGBEE | 13 | 32% | −29 | .09% |
| ID:345 | WIFI | 9 | 42% | −34 | .02% |
| ID:345 | WIFI | 11 | 52% | −32 | .04% |
| ID:345 | BLUETOOTH | 30 | 61% | −57 | .08% |
| ID:345 | BLUETOOTH | 32 | 70% | −12 | .10% |

As shown in Table 6, three nearby devices 702 were identified (devices having IDs 123, 234, and 345) and the table includes the channel mappings for those three devices 702.

In step 1008, remote computer system 706 generates a new channel mapping by selecting channels from the mappings provided by the nearby devices. For example, for each available protocol (e.g., ZIGBEE, WIFI and BLUETOOTH), remote computer system 706 could identify the channels listed with the lowest PER, duty cycle, or another attribute for inclusion in an optimized channel mapping. For example, remote computer system 706 can generate a list of ZIGBEE channels for inclusion in an optimized channel mapping by identifying the ZIGBEE channels in Table 6 having the lowest PERs and incorporating those channels into the optimized channel mapping. Remote computer system 706 can use a similar approach to identify WIFI and BLUETOOTH channels having the lowest PERs and incorporating those channels into an optimized channel mapping.

In step 1010, the optimized channel mapping is transmitted by remote computer system 706 to the device 702*a* and device 702*a* reconfigures the device's communication controllers to utilize the channels listed in the channel mapping received from remote computer system 706.

In some cases, the channel mapping provided by remote computer system 706 may identify channels for communication protocols that are not implemented by device 702*a* (i.e., device 702*a* does not include a communication controller configured to communicate using the protocol). For example, the channel mapping may include a listing of optimized ZIGBEE channels, but device 702*a* may not include a ZIGBEE communication controller. In that case, device 702*a* may be configured to simply ignore channels listed in the channel mapping for not-implemented communication protocols.

In some other cases, the channel mapping may not include a listing of optimized communication channels for a protocol that is implemented by device 702*a*. For example, device 702*a* may include a ZIGBEE communication controller, but the optimized channel mapping may only include listings of optimized WIFI and BLUETOOTH channels. In that case, device 702*a* may utilize the channel listed in the channel mapping for protocols that are implemented by device 702*a* and may use conventional initiation protocols to setup channels for the protocol for which no channels were listed in the channel mapping.

In an embodiment, a device includes a WIFI communication controller, a ZIGBEE communication controller, a BLUETOOTH communication controller, and a processor. The processor is configured to execute instructions for determining, using the WIFI communication controller, a WIFI channel designated for communications by the WIFI communication controller. The WIFI channel is associated with a first duty cycle. The processor is configured to execute instructions for determining, using the ZIGBEE communication controller, a first set of ZIGBEE channels designated for communications by the ZIGBEE communication controller. Each ZIGBEE channel of the first set of ZIGBEE channels is associated with a duty cycle. The processor is configured to execute instructions for determining a number of available BLUETOOTH channels that do not overlap the WIFI channel or any ZIGBEE channel of the first set of ZIGBEE channels, determining that the number of available BLUETOOTH channels is less than a threshold number of BLUETOOTH channels required for communication using a BLUETOOTH protocol, and determining the WIFI channel has a minimum duty cycle from among the duty cycle associated with the WIFI channel and each duty cycle associated with each ZIGBEE channel of the first set of ZIGBEE channels. The processor is configured to execute instructions for determining a first BLUETOOTH channel having a first bandwidth that at least partially overlaps a second bandwidth of the WIFI channel, and causing the BLUETOOTH communication controller to transmit data using the first BLUETOOTH channel.

In an embodiment, a device includes a first communication controller, a second communication controller, and a processor. The processor is configured to execute instructions for determining, using the first communication controller, a first set of channels. Each channel in the first set of channels is associated with a duty cycle. The processor is configured to execute instructions for determining a first channel, from the first set of channels, based on the duty cycle of each channel from the first set of channels, determining a second channel that at least partially overlaps the first channel, and causing the second communication controller to transmit or receive data using the second channel.

In an embodiment, a method includes determining, using a first communication controller in a device, a first set of channels. Each channel in the first set of channels is associated with a duty cycle. The method includes determining a first channel, from the first set of channels, based on the duty cycle of each channel from the first set of channels, and causing a second communication controller in the device to transmit or receive data using a second channel. A first bandwidth of the first channel includes a frequency in a second bandwidth of the second channel.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A computer system, comprising:
   one or more processors; and
   one or more memories storing instructions that, upon execution by the one or more processors, configure the computer system to:
   receive, from a first device, first data indicating a first communication channel in-use by the first device and a first characteristic of the first communication channel;
   receive, from the first device, second data indicating that a second device is in communication with the first device;
   receive, from the second device, third data indicating a request for a communication channel to use;
   determine, from a plurality of communication channels that include the first communication channel, a second communication channel based at least in part on the first characteristic of the first communication channel and a second characteristic of the second communication channel; and
   send, to the second device, fourth data indicating the second communication channel, the fourth data causing the second device to communicate with the first device by at least using the second communication channel.

2. The computer system of claim 1, wherein the one or more memories store additional instructions that, upon execution by the one or more processors, configure the computer system to:
   determine that the second communication channel is in-use by the first device, wherein each one of the first characteristic and the second characteristic represents a duty cycle, a received signal strength indicator (RSSI), or a packet error rate; and
   select the second communication channel instead of the first communication channel based at least in part on a comparison of the first characteristic and the second characteristic.

3. The computer system of claim 1, wherein the one or more memories store additional instructions that, upon execution by the one or more processors, configure the computer system to:
   determine that the first communication channel corresponds to a first communication protocol and that the second communication channel corresponds to a second communication protocol; and select the second communication channel instead of the first communication channel based at least in part on a comparison of the first characteristic and the second characteristic.

4. The computer system of claim 1, wherein the one or more memories store additional instructions that, upon execution by the one or more processors, configure the computer system to:
   determine that the second communication channel is in-use by the first device;
   determine that the second device is in proximity to a third device;
   determine that the first communication channel and the second communication channel are in-use by the third device;
   determine a first average value of the first characteristic and a second average value of the second characteristic; and
   select the second communication channel instead of the first communication channel based at least in part on a comparison of the first average value and the second average value.

5. The computer system of claim 1, wherein each one of the first characteristic and the second characteristic is a duty cycle, and wherein the one or more memories store additional instructions that, upon execution by the one or more processors, configure the computer system to:
   determine a first received signal strength indicator (RSSI) of the first communication channel and a second RSSI of a third communication channel; and
   select the third communication channel based at least in part on the first RSSI and the second RSSI, wherein the fourth data further indicates the third communication channel and causes the second device to communicate with the first device by further using the third communication channel.

6. The computer system of claim 5, wherein the first communication channel, the second communication channel, and the third communication channel correspond to a same communication protocol.

7. The computer system of claim 5, wherein the first communication channel and the second communication channel correspond to a first communication protocol, and the third communication channel correspond to a second communication protocol.

8. The computer system of claim 1, wherein the first device and the second device are co-located.

9. A method implemented by a computer system, the method comprising:
   receiving, from a first device, first data indicating a first communication channel in-use by the first device and a first characteristic of the first communication channel;
   receiving, from the first device, second data indicating that a second device is in communication with the first device;
   receiving, from the second device, third data indicating a request for a communication channel to use;
   determining, from a plurality of communication channels that include the first communication channel, a second communication channel based at least in part on the first characteristic of the first communication channel and a second characteristic of the second communication channel; and
   sending, to the second device, fourth data indicating the second communication channel, the fourth data causing the second device to communicate with the first device by at least using the second communication channel.

10. The method of claim 9, further comprising:
    receiving, from the second device, fifth data indicating that the first communication channel is in-use by the second device and a second value of the first characteristic, wherein the first data indicates a first value of the first characteristic; and
    generating the fourth data based at least in part on a comparison of the second value to a threshold value.

11. The method of claim 9, further comprising:
    receiving, from the second device, fifth data indicating an identifier of a device group to which the second device belongs;
    determining, based at least in part on the identifier, that the first device belongs to the device group; and
    generating the fourth data based at least in part on the fifth data.

12. The method of claim 11, further comprising:
    determining, from the first data, the identifier of the device group;
    storing, based at least in part on the first data, an association between the first characteristic and the device group;
    determining, from the fifth data, the identifier of the device group and the request of the second device, the fifth data including the third data;
    determining, based at least in part on the identifier of the device group and the request, the association; and
    determining, based at least in part on the association, the first characteristic.

13. One or more non-transitory computer-readable storage media storing instructions that, upon execution on a computer system, cause the computer system to perform operations comprising:
    receiving, from a first device, first data indicating a first communication channel in-use by the first device and a first characteristic of the first communication channel;
    receiving, from the first device, second data indicating that a second device is in communication with the first device;
    receiving, from the second device, third data indicating a request for a communication channel to use;
    determining, from a plurality of communication channels that include the first communication channel, a second communication channel based at least in part on the first characteristic of the first communication channel and a second characteristic of the second communication channel; and
    sending, to the second device, fourth data indicating the second communication channel, the fourth data causing the second device to communicate with the first device by at least using the second communication channel.

14. The one or more non-transitory computer-readable storage media of claim 13 storing additional instructions that, upon execution on the computer system, cause the computer system to perform further operations comprising:
    determining, based at least in part on the first data, a first channel mapping of the first device, wherein the first channel mapping indicates first communication channels in-use by the first device, a communication protocol corresponding to each communication channel in-use by the first device, and a characteristic corresponding to each communication channel in-use by the first device; and
    determining a second channel mapping of the second device, wherein the fourth data is generated based at least in part on the first channel mapping and the second channel mapping and indicates a third channel mapping, wherein the third channel mapping indicates second communication channels available to the second device and a communication protocol corresponding to each communication channel available to the second device.

15. The one or more non-transitory computer-readable storage media of claim 14, wherein the first channel mapping indicates at least one of a duty cycle value, a received signal strength indicator (RSSI) value, or a packet error rate value for each communication channel in-use by the first device, and wherein the second communication channel is determined based at least in part on duty cycle values, RSSI values, or packet error rate values corresponding to the plurality of communication channels.

16. The one or more non-transitory computer-readable storage media of claim 13 storing additional instructions that, upon execution on the computer system, cause the computer system to perform further operations comprising:
   determining, from the second data, a received signal strength indicator (RSSI) value corresponding to a signal broadcasted by the second device, wherein the third data requests a channel mapping; and
   generating the fourth data, wherein the fourth data indicates the channel mapping.

17. The one or more non-transitory computer-readable storage media of claim 13 storing additional instructions that, upon execution on the computer system, cause the computer system to perform further operations comprising:
   determining, from the first data, a channel mapping of the first device, wherein the channel mapping indicates first communication channels in-use by the first device, a communication protocol corresponding to each communication channel in-use by the first device, and a packet error rate corresponding to each communication channel in-use by the first device; and
   generating an average packet error rate for each channel across communication protocols, wherein the second communication channel is determined based at least in part on average packet error rates.

18. The one or more non-transitory computer-readable storage media of claim 17, wherein the second communication channel has the lowest average packet error rate among the plurality of communication channels.

19. The one or more non-transitory computer-readable storage media of claim 13 storing additional instructions that, upon execution on the computer system, cause the computer system to perform further operations comprising:
   determining, from the first data, a first channel mapping of the first device, wherein the first channel mapping indicates first communication channels in-use by the first device, a communication protocol corresponding to each communication channel in-use by the first device, and a packet error rate corresponding to each communication channel in-use by the first device;
   storing the first channel mapping; and
   retrieving, based at least in part on the second data, the first channel mapping from storage.

20. The one or more non-transitory computer-readable storage media of claim 19, storing further instructions that, upon execution on the computer system, cause the computer system to perform additional operations comprising:
   determining, per communication protocol, a corresponding channel having the lowest packet error rate; and
   indicating, in a second channel mapping, each communication protocol and the corresponding channel having the lowest packet error rate, wherein the fourth data indicates the second channel mapping.

* * * * *